United States Patent [19]

Progl

[11] Patent Number: 5,032,067

[45] Date of Patent: Jul. 16, 1991

[54] LUBRICATING - OIL PUMP CONTROL

[75] Inventor: Rudolph Progl, Rock Hill, S.C.

[73] Assignee: Textron Inc., Providence, R.I.

[21] Appl. No.: 469,038

[22] Filed: Jan. 23, 1990

Related U.S. Application Data

[63] Continuation-in-part of Ser. No. 200,506, May 31, 1988.

[51] Int. Cl.⁵ .................................................. F04B 7/06
[52] U.S. Cl. .................................... 417/500; 184/33
[58] Field of Search ................... 412/500, 502; 184/33

[56] References Cited

U.S. PATENT DOCUMENTS

| | | | |
|---|---|---|---|
| 2,347,364 | 4/1944 | Palumbo | 123/45 R |
| 3,914,073 | 10/1975 | Fusco | 417/500 |
| 4,541,789 | 9/1985 | Northdurf | 417/500 |
| 4,636,147 | 1/1987 | Schweitzer | 184/33 |
| 4,661,051 | 4/1987 | Nakamura et al. | 417/500 |
| 4,678,411 | 7/1987 | Wieland | 417/500 |
| 4,797,073 | 1/1989 | Kubota | 417/500 |

Primary Examiner—Leonard E. Smith
Assistant Examiner—Eugene L. Szczecina, Jr.
Attorney, Agent, or Firm—Abraham Ogman

[57] ABSTRACT

The invention is directed to a motor-driven apparatus such as a motor-driven chain saw and the like having a lubricating oil pump having a piston which rotates about its central axis and an oil supply for a work tool. There is also a control means containing a rotating piston having cam member on the piston interacting with a control pin member which acts as a cam follower. There is provided means for adjusting the percentage of contact made between the cam member and the cam follower per revolution of the pumping member.

1 Claim, 5 Drawing Sheets

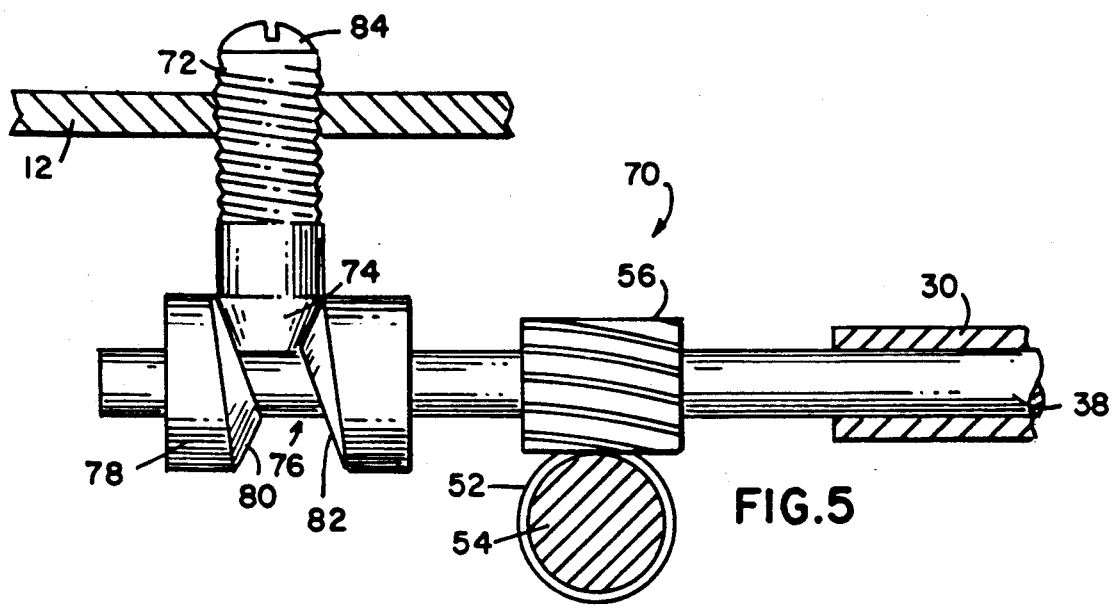
FIG.5
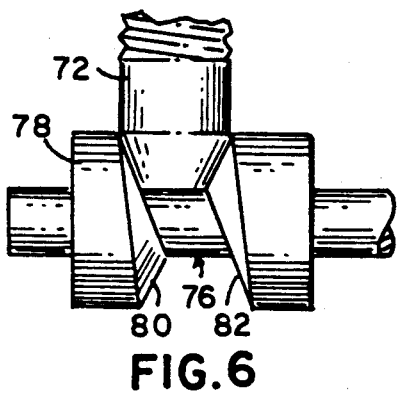
FIG.6
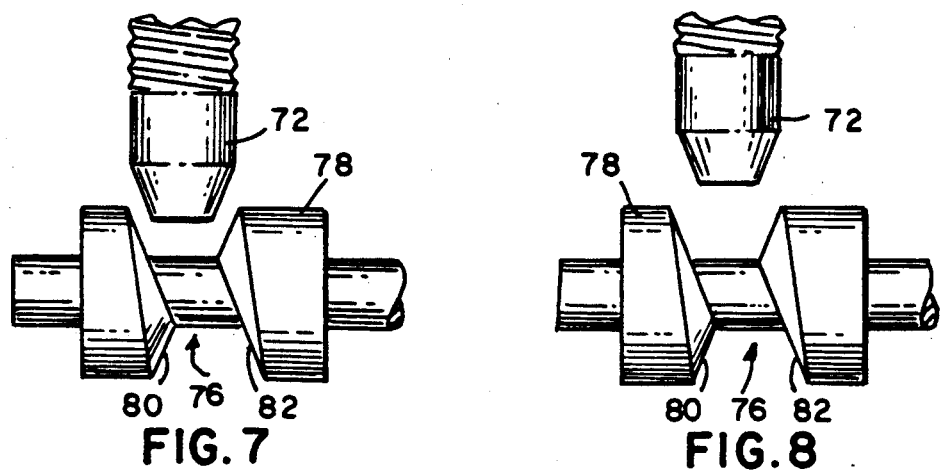
FIG.7
FIG.8

A

B

C

LUBRICATING - OIL PUMP CONTROL

This is a continuation-in-part of Ser. No. 200,506 filed May 31, 1988 now pending entitled Lubricating-Oil Pump Control assigned to the Assignee of this application.

FIELD OF THE INVENTION

The present invention relates to a lubricating-oil pump for motor-driven apparatus such as chain saws and the like wherein the pump delivers oil to the work tool of the apparatus. More particularly the invention relates to a reciprocating oil pump control apparatus for selective regulation of the oil flow from full flow through no flow in response to the stroke distance of the pumping piston.

BACKGROUND OF THE INVENTION

Conventional motor-driven apparatus such as motor-driven chain saws have as standard equipment a lubricating-oil pump feeding lubricating oil from an oil tank to the moving saw chain.

Known motor-driven apparatus such as motor-driven chain saws where the saw chain moves around a guide bar are equipped with a lubricating-oil pump which in the operation of the chain saw continuously feeds lubricating oil for the chain links into a groove in the guide bar. Motor driven apparatus of this type are also equipped with other attachments or tools, for example with hedge trimmers, drills or the like which require no lubrication during operation. Further, it is known to equip motor-driven chain saws with sharpening devices which permit resharpening the cutting links with the motor running and the saw chain rotating.

When working with the known attachment tools which require no oil lubrication, it has been customary to drain the oil tank prior to mounting the attachment in order to avoid an unintentional oil leakage. For this purpose, the lubricating oil was collected in a suitable container to be saved for later use. In various applications the operator did not drain the oil tank so that oil continued to be fed without being needed; this resulted in additional oil consumption and environmental pollution. Also in other operations such as when the tool is being operated in the idle state, continuous lubrication of the tool is unnecessary.

In U.S. Pat. No. 2,070,203 there is disclosed a reciprocating oil pump in which the amount of oil pumped can be varied between a maximum delivery and a minimum deliver. As disclosed the piston in the pumping cylinder is provided with a pair of spaced cams rotatable with the piston. A sleeve providing a bearing for a portion of the piston is provided and has a cam pin secured to it for reciprocating the piston. The sleeve bearing is rotatably adjustable so as to change the relative circumferential position of the cam pin and cam surfaces to thereby change the quantity of oil pumped from a maximum delivery to a minimum delivery.

In U.S. Pat. No. 4,678,411 there is shown a control wherein the volume of oil is regulated by the interaction of a control cam and a control bolt which may be rotated to vary the stroke of the pump.

The U.S. Pat. No. 2,347,364 discloses the use of tapered pin and a matching two-walled cam surface to reciprocate a rotating piston.

In U.S. Pat. No. 4,797,073 a tapered pin cam follower is used to vary the stroke of a piston.

U.S. Pat. No. 4,636,147 discloses a lubricating-oil pump for a motor-driven apparatus which provides for activating and interrupting the supply of lubricating oil to the tool driven be the motor.

Accordingly, a principal desirable object of the invention is to provide a lubricating-oil pump system having a rotating and reciprocating piston for a motor-drive apparatus and the like with a state of art control apparatus for regulating the quantity of oil from full maximum flow through a full intermediate range to a no flow or interrupted flow state.

Another object of the invention is to provide such control of flow by means of a camming pin having a cam follower and a complementary cam surface where the stroke of the pump's piston is inversely proportional to the predetermined axial space between the cam follower on the camming pin and the cam surface; the space controls the percentage of time the cam surface and cam follower are in contact during a revolution of the piston.

Yet another object of the invention is to adjust the piston stroke of a lubricating-oil pump having a rotating and reciprocating piston by varying the time per revolution a cam surface is on the piston in contact with its complementary cam follower and control pin.

Still another object of the invention is to provide a lubricating-oil pump having a rotating and reciprocating piston where the volume of oil pumped is a function of an axial adjustment of the piston and the time per revolution a cam surface is in contact with its cam follower.

SUMMARY OF THE INVENTION

The invention provides a lubricating oil pump control system for motor driven apparatus such as a chain saw oil pump comprising an engine supported by a suitable frame, together with means on the frame defining a pumping chamber including an inlet and an outlet, and a pumping member having means for imparting rotary and reciprocatory movement to the pumping member in the pumping chamber relative to the inlet and outlet so as to effect an oil pumping operation incident to such movement alone or together with other control means for selectively regulating the quantity of oil flow to the work tool.

In one embodiment of the invention an oil pump for supplying lubricating oil to the work tool of a motor driven apparatus includes a frame supporting the work tool, wall means on the frame defining a pumping chamber including an oil inlet port and an oil outlet port, a pumping member rotatably mounted in the pumping chamber relative to the inlet and outlet ports so as to effect rotary movement of the pumping member or piston though the predetermined stroke distance for pumping the lubricating oil. Control means are provided for selectively varying the quantity of oil flow in the intermediate range between full maximum flow and no flow including means for selectively adjusting the stroke distance of the pumping member or piston relative to the inlet and outlet ports and the predetermined stroke distance and means for positively positioning the pumping member for the stroke distance selected.

In another embodiment of the invention, the means for regulating the flow of lubricating oil includes a cam member fixed on the piston and rotatable therewith and having a tapered annular groove inclined to a plane perpendicular to the axis of rotation of the pumping member, a tapered pin member extending from the frame and engaging the tapered annular groove for providing axial reciprocatory movement of the pumping member through a predetermined stroke distance in response to rotation of the cam member, and means for selectively varying the flow of oil including means for moving the tapered pin member within the tapered cam groove in a plane perpendicular to the axis of rotation of the pumping member between a position of full contact with the tapered groove where a maximum quantity of oil is pumped relative to the rotary and axial movement of the pumping member through intermediate positions where the time the pin is in contact with the tapered groove is reduced thereby reducing the stroke of the piston thus reducing the quantity of oil flow and finally to a position of no-contact with the cam groove where the pumping of oil due to the rotation of the pumping member or piston stops.

In still another embodiment the the pin member having a variable cross sectional area in a plane parallel to the axis of rotation of the pumping member, can be varied to vary the time the pin is in contact with a cam groove surface to vary the stroke of the pumping member or piston to vary the volume of oil pumped.

BRIEF DESCRIPTION OF THE DRAWINGS

The novel features that are considered characteristic of the invention itself, however, both as to its organization and method of operation, together with additional objects and advantages thereof, will best be understood from the following description of a specific embodiment, when read in conjunction with the accompanying drawings, in which:

FIG. 5 is a fragmentary side elevation view of a lubricating pump illustrating another embodiment of the present invention;

FIGS. 6, 7 and 8 are fragmentary schematic views showing various positions of the device which regulates the flow of lubricating oil in accordance with the invention;

DETAILED DESCRIPTION OF PREFERRED EMBODIMENTS

Figure 1:
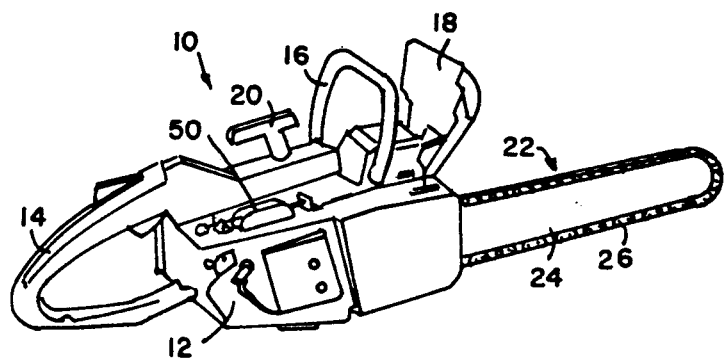
FIG. 1 is a perspective view of a chain saw incorporating various features of the invention.

The motor driven apparatus illustrated in FIG. 1 of the drawings is in the form of a motor-driven chain saw designated generally by the numeral 10 and includes a drive motor (not shown) mounted in housing frame 12 which is provided with a rearward guide handle 14, a forward carrying handle 16, and a guard 18. On top of housing 12 is a pull starter 20 for starting the drive motor. In addition the motor-driven chain saw 10 includes a forwardly extending guide bar assembly 22 having a guide bar 24 on which a saw chain 26 is guided in its movement around the guide. The engine drivingly rotates a conventional drive sprocket (not shown) around which is trained chain 26 which travels in a peripheral groove (not shown) about the guide bar 24.

Also included in the chain saw 10 and supported by the housing frame 12 is an oil or lubricating pump designated generally by the numeral 28 which includes a wall means 30 defining a pumping chamber 32 having spaced inlet and outlet ports 34 and 36 which respectively communicate through a conduit (not shown) which delivers oil to the saw chain 26 all as is well known. Also included in the lubricating pump 28 is a piston or pumping member 38 which is mounted for rotary and reciprocal movement relative to the pumping chamber 32 so as to effect pumping of lubricating oil from the inlet port 34 in the chamber 32 and the pumping of the lubricating oil from the chamber 32 through the outlet port 36 and into a discharge conduit for delivery to the area to be lubricated.

Figure 2:
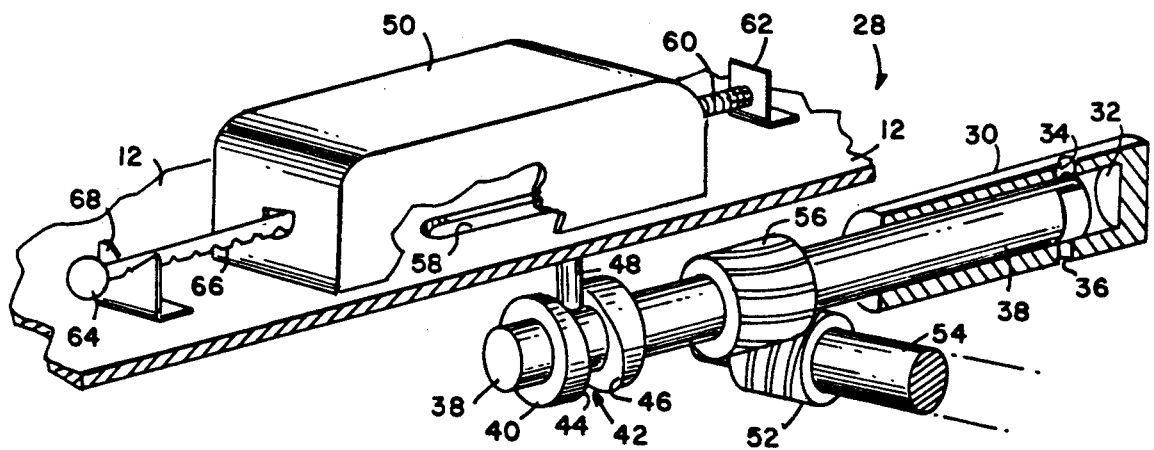
FIG. 2 is an enlarged, fragmentary perspective view, with parts broken away and in section, of a lubricating pump in accordance with the invention and incorporated in the chain saw of FIG. 1 and shown in operative connection.
Figure 3:
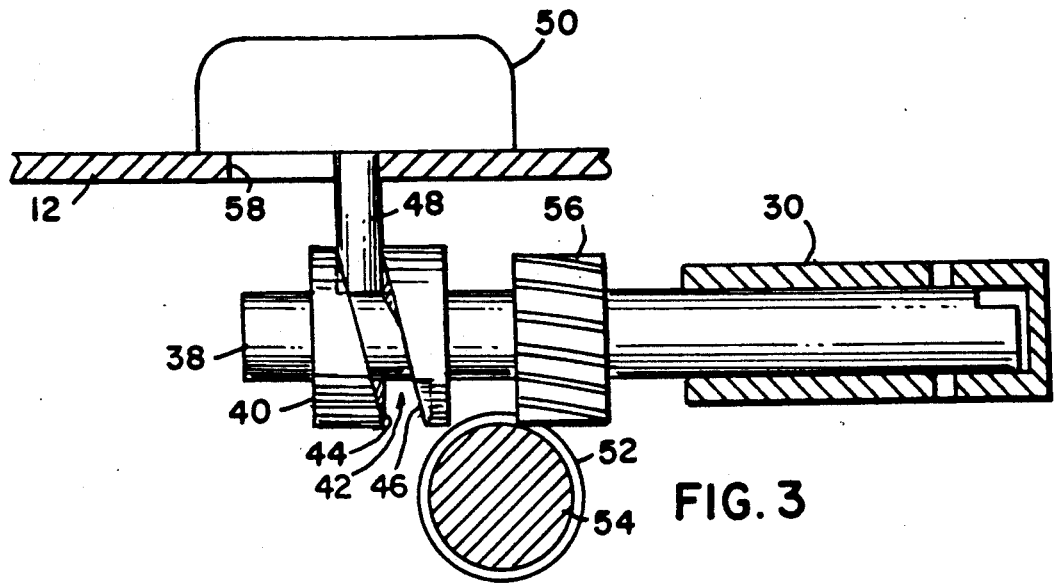
FIG. 3 is a side elevation view partly in section of the lubricating pump of FIG. 2 with the pumping member in position for pumping lubricating oil.
Figure 4:
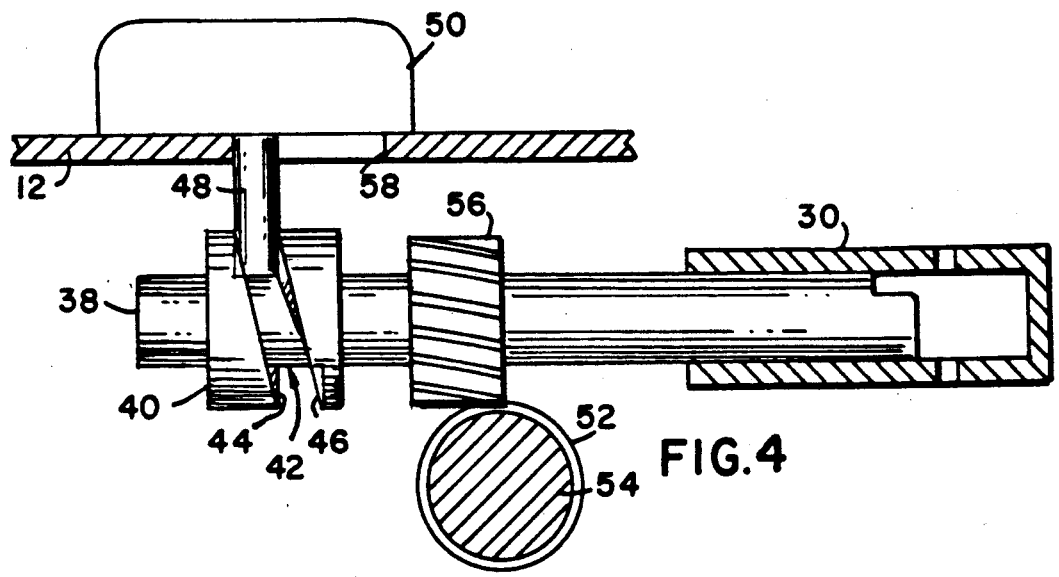
FIG. 4 is a view similar to FIG. 3 but showing the pumping member in position for interrupting the flow of lubricating oil.

The oil pump 28 also includes means for reciprocating or axially displacing the pumping member 38 in response to rotation of the piston to provide positive actuation and comprises a cam member 40 carried or fixed on piston 38, an annular groove 42 formed in cam member 40 and which is inclined to a plane perpendicular to the axis of pumping member 38 and has groove surfaces 44 and 46. The cam groove 42 receives pin member 48 which is attached to a positive positioning means such as for example, control member 50 and moveable therewith. The pin member 48 is in effect a cam follower. The control member 50 is supported on a portion of housing frame 12. Rotation of pumping member 38 is accomplished by a first gear 52 fixed on shaft 54 rotated by the drive motor or engine together with a second gear 56 in mesh with the first gear 52 and carried by the piston 38 for rotary and axial movement relative thereto. Thus in the arrangement shown in FIGS. 2 and 3 rotation of shaft 54 serves to rotate pumping member 38 whereby pin member 48 engages and follows the surfaces 44 and 46 of cam member annular groove 42. The rotary movement of cam member 40 serves to effect positive reciprocation of the pumping member or piston 38 through a predetermined stroke distance in both directions to effect pumping of the lubricating oil. In the embodiment of FIGS. 2-4 the control member 50 is mounted on housing 12 so that pin member or cam follower 48 extends through slot opening 58 to engage cam groove. The slot opening 58 is preferably axially aligned with pumping member 38 and permits axial movement of the control member 50 and associated pin member 48 in the direction of the axial movement of the pumping member 38 so as to effect axial movement of the pumping member in response to movement of control member 50. In this manner the control member 50 coacts with the pin 48 through cam member 40 to impart axial movement of the pumping member 38 between the first position (as shown in FIG. 3) adjacent to the rotary and axial movement of the pumping member.

When the control member 50 is moved in the opposite direction to a second position (as shown by FIG. 4) and the pumping member is removed from the oil inlet and outlet ports 34 and 36 whereby it does not contact them during rotary and axial movement with the result that the pumping and flow of oil is interrupted. In this manner, the control member 50 provides a positive positioning means for the regulation of oil flow from maximum flow to interruption of oil flow when it is not needed. Also in accordance with the embodiment shown in FIGS. 2-4 means can be provided for moving and securing the control member at the selected positions. As shown in FIG. 2, the control member can be provided with a spring means 60 such as a helical spring attached to a housing stud 62 urging or biasing the control member in the first position maximum flow (FIG. 3) while still being yieldable to movement of rod member 64 for moving the control member 50 through intermediate positions for reducing the flow to, for example, the second or last position as shown by FIG. 4 at which position there is no flow of oil. The rod member can be releasably secured in the selected positions by placing the notches 66 of rod member 64 in the notch receiver 68 secured to frame 12 it is to be understood that the control 50 and associated moving and securing means are symbolic and that other positive positioning means remote or adjacent, and manual or automatic, can be employed to move pin member 48 and thereby regulate the quantity of flow of lubricating oil.

Referring now to FIGS. 5-8, there is shown another embodiment of the invention for regulating the flow of lubricating oil. In this embodiment, the lubricating pump 70 is similar to pump 28 of FIG. 2 except for the means selectively varying the flow of oil. As shown, the oil flow control means comprises a threaded camming pin member 72 which threadedly engages housing frame 12 and has a tapered end portion 74 which is received by the tapered groove 76 of a cam 78. Tapered groove 76 is defined by sides 80 and 82 and is inclined or disposed at an angle to a plane perpendicular to the axis of pumping member or piston 38 as discussed above with respect to FIGS. 2-4. The sides 80 and 82 act as cam surfaces. As mentioned above, suitable positive positioning means manual or automatic, remote or adjacent can be employed to rotate camming pin member to various selected positions relative to the cam groove 76. Suitable manual means, can for example, be a torque device such as a ratchet wrench applied to the rib elements 84. In operation, the camming pin 72 is raised or lowered to provide various stages of engagement with the cam groove and specifically the cam surfaces 80 and 82 from full engagement to no engagement to thereby vary the stroke distance of the pumping member 38 and the amount of flow of lubricating oil from full maximum flow through to fully off.

FIG. 6 illustrates full engagement of the camming pin 72 with the cam groove. In this position the full stroke of the piston 38 through a predetermined stroke distance is provided resulting in maximum pumping of oil. As shown in FIG. 7 the camming pin 72 is raised so that only partial contact of the camming pin 72 with the cam groove surfaces 80 and 82 is achieved during each revolution of the pumping member 38. Positive contact is intermittent because the cam stroke is greater than pin and groove. A partial stroke of pumping member 38 is achieved thereby reducing the stroke distance of the pumping member 38 which results in a reduction in the amount of oil pumped.

Looking at it another way the magnitude of the stroke is inversely proportional to the axial distance between the camming pin 72 and the sides of the groove 80 and 82.

As shown in FIG. 8, when the camming pin 72 is raised to a position where there is no contact with the cam groove during each revolution, the axial stroke of pumping member 38 is stopped and the pumping of oil is interrupted to provide a condition of no oil flow.

Referring now to FIGS. 9-12 there is illustrated still another embodiment of the invention where the length of the stroke of the pumping member 38 is inversely related to the maximum axial space between the camming pin 88 and the inclined sides defining the cam groove 42. In this embodiment the lubricating pump 94 is similar to pump 70 except that the means for controlling or regulating the amount of oil pumped by pumping member 38 includes a pin member 86 which is rotatable in the bore 86 of housing 12 and has at least a configured lower end portion 90 which engages the sides 44 and 46 of cam groove 42 of cam member 40 to provide reciprocating movement of the piston 38.

Figure 12:
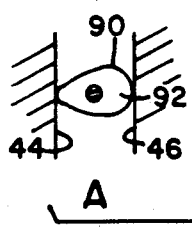
FIG. 12 is a top view of a schematic representation showing the operational relationship of the cam and pin members of FIGS. 9, 10 and 11.
Figure 12:
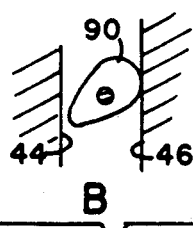
Figure 12:
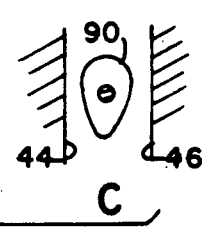

The lower portion 90 of pin member 86 is configured to have a variable cross-sectional area 92 illustrated as a "tear-drop" like shape for example, as best seen in FIG. 12. In this embodiment, rotation of pin member 86 about its vertical axis rotates the end portion or cam follower 90 within the cam groove 42 so that when in the position shown in FIGS. 9 and 12A both surfaces 44 and 46 of cam groove 42 are engaged to provide a full stroke distance of the pumping member 38.

Figure 10:
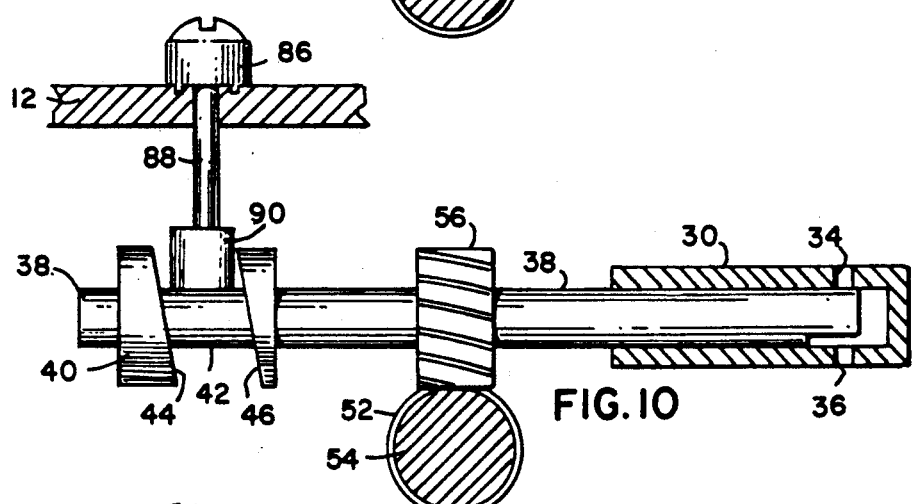
FIG. 10 is a fragmentary side elevation view partly in section of the lubricating pump of FIG. 9 shown in an intermediate reduced pumping mode.

Further rotation of pin member 86 to the position shown in FIGS. 10 and 12B, for example, reduced the amount of contact (increased the axial separation) of the cam follower 90 with the cam groove surfaces during rotation of the piston or pumping member 38 thereby resulting in a reduced or partial stroke distance and a reduction in the amount of oil being pumped.

Figure 11:
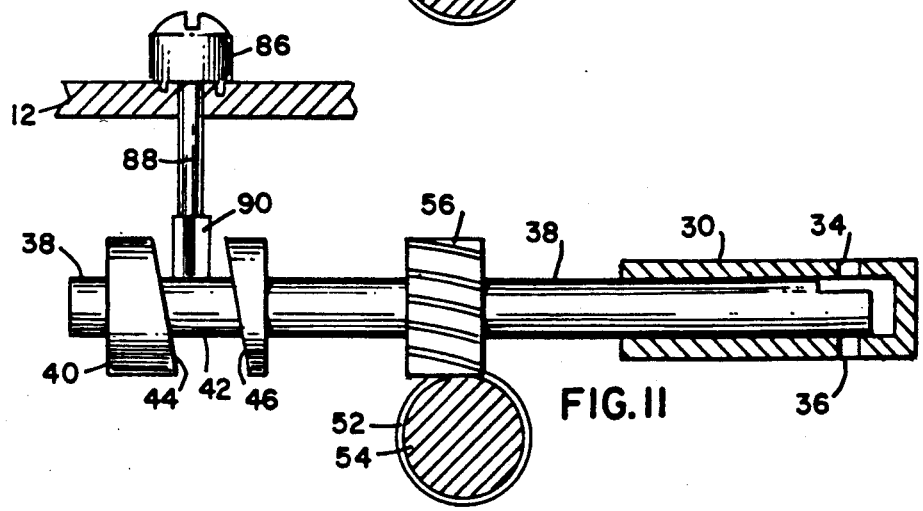
FIG. 11 is a side elevation view of the lubricating pump of FIG. 9 shown in a fully interrupted mode.

Further, rotation of pin member 86 to the position shown in FIGS. 11 and 12C where there is no contact by the cam follower 90 of the pin member 84 with the surfaces of cam groove 42 results in interruption of the reciprocating stroke action of pumping member 38 and thereby interrupts the pumping of lubricating oil. The lubricating pump 94 of FIGS. 9-11 is similar to the pump 28 of FIG. 2 in all other respects.

Figure 9:
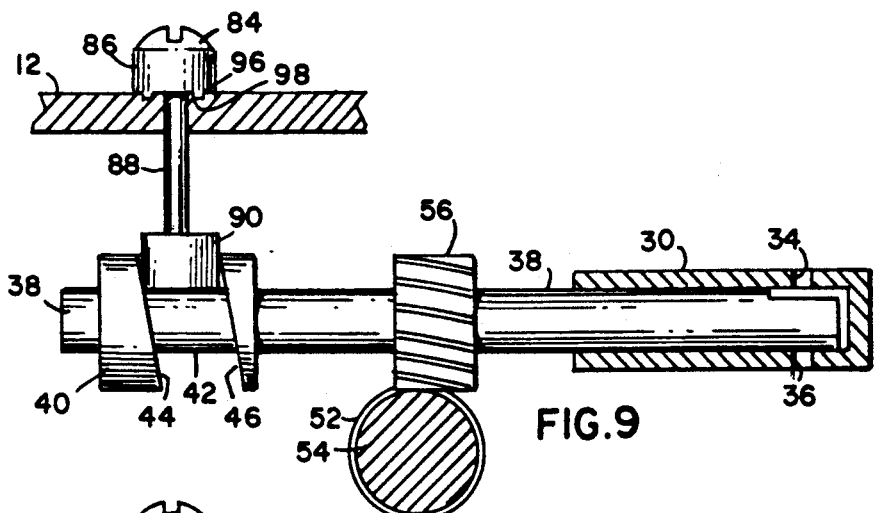
FIG. 9 is a fragmentary side elevation view partly in section of a lubricating pump showing still another embodiment of the present invention in full pumping mode.

Referring to FIG. 9 the pin member 86 can be provided with means for positive positional rotation, such as, for example, ribs 84 and studs 96 and corresponding detents 98 in frame 12 for releasably holding the pin member 86 in a selected rotary position. Again it is to be understood that such positive positioning rotational means is symbolic and that other suitable positive positional means can be employed which can be either manual or automatic.

Figure 13:
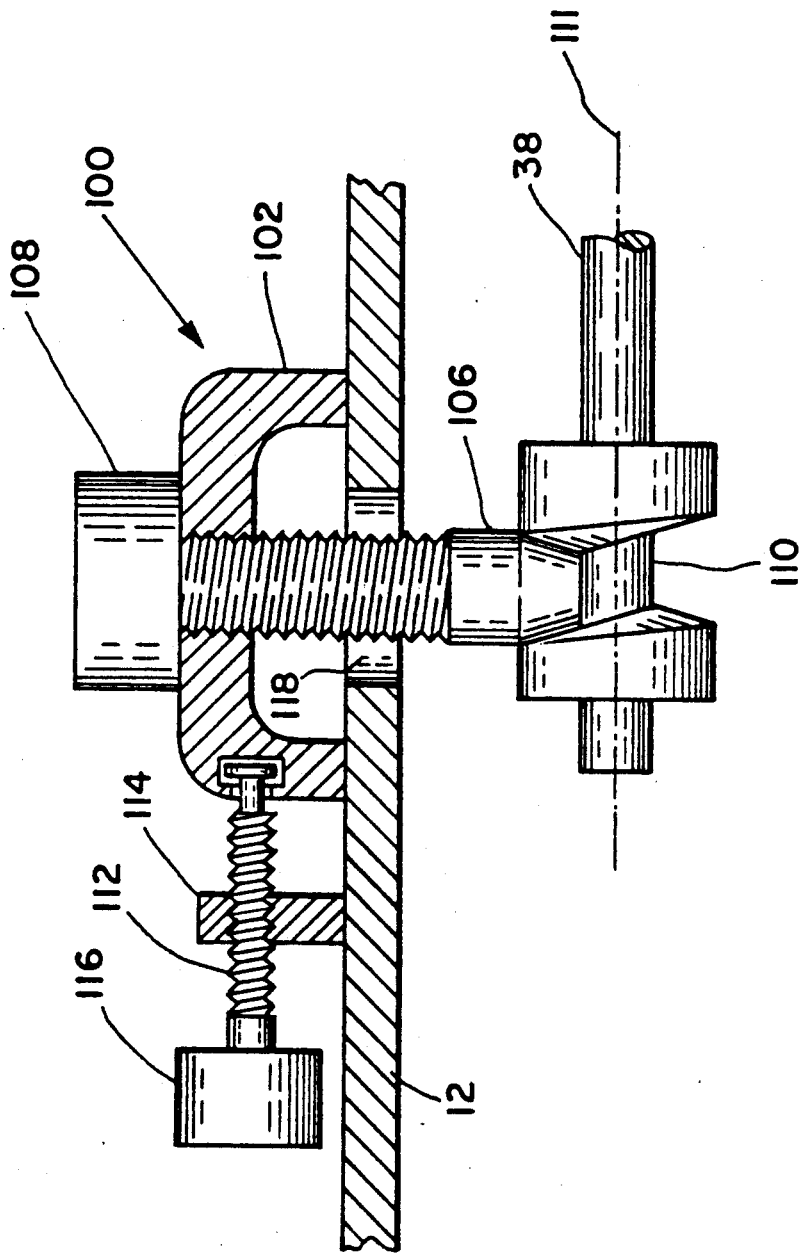
FIG. 13 is a fragmentary schematic representation of how the control pins of FIGS. 5 and 9 may be combined with the axial control configuration in FIG. 3 so that the flow of oil may be controlled independently by the control pin or the axial control or in combination.

Referring to FIG. 13 there is shown a control means that combines the action of moving the pumping member 38 along its central axis and controlling the percentage of contact between the the pin member and the cam member.

Specifically, there is shown a control means generally designated 100 mounted on the housing frame 12. The control means includes a slide 102 in which a threaded pin member 106 terminating in a knob 108 is provided. Also illustrated is a pumping member 38 which rotates about a central axis. The pumping member 38 contains a cam groove 110 with a central axis 111 of the pumping member 38.

A second threaded member 112 is trained through a frame support 114. At one end the threaded member 112 is connected to the slide 102. At the other end there is a knob 116 to rotate the threaded member 112.

When the knob 116 is rotated the slide 102 is moved axially on the frame 12. The pin member 106 is moved axially through the hole 118 defined in the frame 12. When moved axially the pin member 106 moves the pumping member 38 axially for adjusting the flow of oil in the manner described in relation to FIGS. 3 and 4.

When knob 108 is rotated the pin member is moved radially into full contact, partial contact and no contact with the cam groove altering the flow of oil in the manner discussed in connection with FIGS. 5–8.

It is quite obvious that the pin member can be configured in the manner shown in FIGS. 9–12 in which case the pin member would perform in the manner described in connection with these figures.

It is believed evident from the foregoing that the present invention provides an improved lubricating pump control apparatus for regulating the flow of oil to the work to of a motor driven apparatus from maximum flow to interrupted flow.

There are numerous situations in the operation of a motor-driven apparatus such as a chain saw where it is desirable to vary the oil delivery to the work tool. For example, when the speed of the motor is reduced to idle speed, when the size of the saw chain is changed to a smaller size, and when the work piece is changed from dry wood to moist wood, reduction in the amount of oil delivery is desirable to accommodate each situation. By the same token when the foregoing situations are reversed an increase in the amount of oil flow is desirable to accommodate the situation.

It can be appreciated that the present invention provides the advantage of variable oil delivery to accommodate the varying requirements of the work tool and work piece.

While the invention has been described with respect to preferred embodiment, it will be apparent to those skilled in the art that changes and modifications may be made without departing from the scope of the invention herein involved in its broader aspects. Accordingly, it is intended that all matter contained in the above description, or shown in the accompanying drawing shall be interpreted as illustrative and not in a limiting sense.

I claim:

1. An oil pump for supplying lubricating oil to the work tool of a motor driven apparatus including a frame supporting said work tool, wall means on said frame defining an elongated pumping chamber having a central axis and including an oil inlet port and an oil outlet port, a pumping member configured to rotate about said central axis and to reciprocate through a predetermined stroke distance along the central axis for pumping said oil, and means to effect rotary movement of said pumping member the improvement comprising:

an annular cam groove situated in the pumping member, said annular cam groove being defined by a pair of opposing walls inclined relative to the axis of rotation to define the predetermined stroke distance;

a pin member coacting with the walls of the annular cam groove for causing the pumping member to reciprocate through the predetermined stroke distance in response to the rotary motion;

control means for adjusting the percent of contact between the pin member and the walls of the cam groove per revolution of said pumping member for selectively varying the amount of oil being pumped from full flow, to intermediate, flow to no flow, and said control means includes in a addition means for moving the pin member axially to move the pumping member axially along said central axis.

* * * * *